(12) United States Patent
Kang et al.

(10) Patent No.: US 7,689,344 B2
(45) Date of Patent: Mar. 30, 2010

(54) METHOD AND APPARATUS FOR CONTROLLING TRANSITIONS IN AN ENGINE HAVING MULTI-STEP VALVE LIFT

(75) Inventors: Jun-Mo Kang, Ann Arbor, MI (US); Chen-Fang Chang, Troy, MI (US); Jyh-Shin Chen, Troy, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 466 days.

(21) Appl. No.: 11/760,249

(22) Filed: Jun. 8, 2007

(65) Prior Publication Data

US 2008/0302319 A1    Dec. 11, 2008

(51) Int. Cl.
*F02D 19/00* (2006.01)
*F01L 1/00* (2006.01)

(52) U.S. Cl. .................. 701/103; 123/90.15; 123/295

(58) Field of Classification Search ......... 701/101–103, 701/110; 123/90.11–90.18, 90.25–90.27, 123/295, 305, 347, 348
See application file for complete search history.

(56) References Cited

U.S. PATENT DOCUMENTS

| | | | | |
|---|---|---|---|---|
| 5,769,054 | A * | 6/1998 | Schnaibel et al. | 123/406.47 |
| 6,055,948 | A | 5/2000 | Shiraishi et al. | |
| 6,343,585 | B1 * | 2/2002 | Fujieda et al. | 123/295 |
| 6,453,871 | B1 * | 9/2002 | Fujieda et al. | 123/295 |
| 6,561,157 | B2 | 5/2003 | Zur Loye et al. | |
| 6,615,129 | B2 | 9/2003 | Kabasin | |
| 6,662,785 | B1 | 12/2003 | Sloane et al. | |
| 6,725,829 | B2 * | 4/2004 | Kataoka et al. | 123/299 |
| 6,758,177 | B1 | 7/2004 | McKay et al. | |
| 6,790,158 | B2 * | 9/2004 | Tabata | 477/33 |
| 6,880,523 | B2 * | 4/2005 | Iwasaki et al. | 123/339.12 |
| 6,971,365 | B1 | 12/2005 | Najt et al. | |
| 6,978,771 | B2 | 12/2005 | Kuzuyama et al. | |
| 6,994,072 | B2 | 2/2006 | Kuo et al. | |
| 7,044,101 | B1 * | 5/2006 | Duty et al. | 123/198 F |
| 7,059,281 | B2 | 6/2006 | Kuo et al. | |
| 7,063,068 | B2 | 6/2006 | Nakai et al. | |
| 7,077,084 | B2 | 7/2006 | Mallebrein | |
| 7,080,613 | B2 | 7/2006 | Kuo et al. | |
| 7,128,051 | B2 * | 10/2006 | Nogi et al. | 123/336 |
| 7,128,062 | B2 | 10/2006 | Kuo et al. | |

(Continued)

FOREIGN PATENT DOCUMENTS

WO    2005/113947 A1    12/2005

*Primary Examiner*—Stephen K Cronin
*Assistant Examiner*—Johnny H Hoang

(57) ABSTRACT

There is provided a method for controlling engine valves of an internal combustion engine adapted to selectively operate at one of a first open position and a second open position, including controlling engine operation during a transition from a first to a second combustion mode. The method comprises determining a desired engine airflow based upon an operator torque request. A cylinder intake volume is determined for the desired engine airflow when operating at the first open position. A control scheme is determined to control the engine valves to attain the cylinder intake volume for the desired engine airflow when operating at the second open position. The control scheme is executed and the engine valve is transitioned to the second open position when the cylinder intake volume to operate at the second open position is within a range of authority of the engine valves.

23 Claims, 8 Drawing Sheets

U.S. PATENT DOCUMENTS

| | | |
|---|---|---|
| 7,163,007 B2 * | 1/2007 | Sasaki et al. ................ 123/673 |
| 7,213,566 B1 | 5/2007 | Jankovic |
| 2006/0144356 A1 | 7/2006 | Sellnau et al. |
| 2006/0196466 A1 | 9/2006 | Kuo et al. |
| 2006/0196467 A1 | 9/2006 | Kang et al. |
| 2006/0196468 A1 | 9/2006 | Chang et al. |
| 2006/0196469 A1 | 9/2006 | Kuo et al. |
| 2006/0236958 A1 | 10/2006 | Sun et al. |
| 2006/0243241 A1 | 11/2006 | Kuo et al. |

* cited by examiner

METHOD AND APPARATUS FOR CONTROLLING TRANSITIONS IN AN ENGINE HAVING MULTI-STEP VALVE LIFT

TECHNICAL FIELD

This invention relates to internal combustion engines, and more specifically to controlling operation thereof.

BACKGROUND OF THE INVENTION

The statements in this section merely provide background information related to the present disclosure and may not constitute prior art.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke, which ignites upon injection. Combustion for both traditional gasoline engines and diesel engines involves premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies have been introduced for internal combustion engines. One of these combustion concepts is known in the art as the homogeneous charge compression ignition (HCCI). HCCI combustion, referred to hereinafter as controlled auto-ignition combustion mode, comprises a distributed, flameless, auto-ignition combustion process that is controlled by oxidation chemistry, rather than by fluid mechanics. In a typical engine operating in the controlled auto-ignition combustion mode, the intake charge is nearly homogeneous in composition, temperature, and residual level at intake valve closing time. Because controlled auto-ignition is a distributed kinetically-controlled combustion process, the engine operates at a very dilute fuel/air mixture (i.e., lean of a fuel/air stoichiometric point) and has a relatively low peak combustion temperature, thus forming extremely low $NO_x$ emissions. The fuel/air mixture for controlled auto-ignition is relatively homogeneous, as compared to the stratified fuel/air combustion mixtures used in diesel engines, and, therefore, the rich zones that form smoke and particulate emissions in diesel engines are substantially eliminated. Because of this very dilute fuel/air mixture, an engine operating in the controlled auto-ignition combustion mode can operate unthrottled to achieve diesel-like fuel economy.

At medium engine speed and load, a combination of valve profile and timing (e.g., exhaust recompression and exhaust re-breathing) and fueling strategy has been found to be effective in providing adequate heating to the cylinder charge so that auto-ignition during the compression stroke leads to stable combustion with low noise. One of the main issues in effectively operating an engine in the auto-ignition combustion mode has been to control the combustion process properly so that robust and stable combustion resulting in low emissions, optimal heat release rate, and low noise is achieved over a range of operating conditions. The benefits of auto-ignition combustion have been known for many years. The primary barrier to product implementation, however, has been the inability to control the auto-ignition combustion process.

A spark-ignition, direct-injection engine capable of operating in controlled auto-ignition combustion mode transitions between operating in an auto-ignited combustion mode at part-load and lower engine speed conditions and in a conventional spark-ignited combustion mode at high load and high speed conditions. There is a need to have a smooth transition between the two combustion modes during ongoing engine operation, in order to maintain a continuous engine output torque and prevent any engine misfires or partial-burns during the transitions These two combustion modes require different engine operation to maintain robust combustion. One aspect of engine operation includes control of the throttle valve. When the engine is operated in the auto-ignited combustion mode, the engine control comprises lean air/fuel ratio operation with the throttle wide open to minimize engine pumping losses. In contrast, when the engine is operated in the spark-ignition combustion mode, the engine control comprises stoichiometric air/fuel ratio operation, with the throttle valve controlled over a range of positions from 0% to 100% of the wide-open position to control intake airflow to achieve stoichiometry.

In engine operation, the engine air flow is controlled by selectively adjusting position of the throttle valve and adjusting opening and closing of intake valves and exhaust valves. Adjusting the opening, and subsequent closing, of intake and exhaust valves primarily takes the form of: phasing of opening (and subsequent closing) of the valve in relation to piston and crankshaft position; and, magnitude of the lift of the valve opening. On engine systems so equipped, opening and closing of the intake valves and exhaust valves is accomplished using a variable valve actuation (VVA) system that includes cam phasing and a selectable multi-step valve lift, e.g., multiple-step cam lobes which provide two or more valve lift profiles. In contrast to the continuously variable throttle position, the change in valve profile of the multi-step valve lift mechanism is a discrete change, and not continuous. When a transition between steps in the selectable multi-step valve lift is not effectively controlled, unwanted disturbances in engine air flow can occur, resulting in poor combustion, including misfire or partial-burns.

Therefore, there is a need to control the engine air flow during a transition between steps in the selectable multi-step valve lift, to achieve robust and stable combustion, low emissions, optimal combustion heat release rate, and low engine noise.

SUMMARY OF THE INVENTION

In accordance with an embodiment of the invention, there is provided a method for controlling engine valves of an internal combustion engine adapted to selectively operate at one of a first open position and a second open position. An exemplary application comprises controlling engine operation during a transition from a first to a second combustion mode. The method comprises determining a desired engine airflow based upon an operator torque request. A cylinder intake volume is determined for the desired engine airflow when operating at the first open position. A control scheme is determined to control the engine valves to attain the cylinder intake volume for the desired engine airflow when operating at the second open position. The control scheme is executed and the engine valve is transitioned to the second open position when the cylinder intake volume to operate at the second open position is within a range of authority of the engine valves.

DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF EMBODIMENTS OF THE INVENTION

Figure 1:
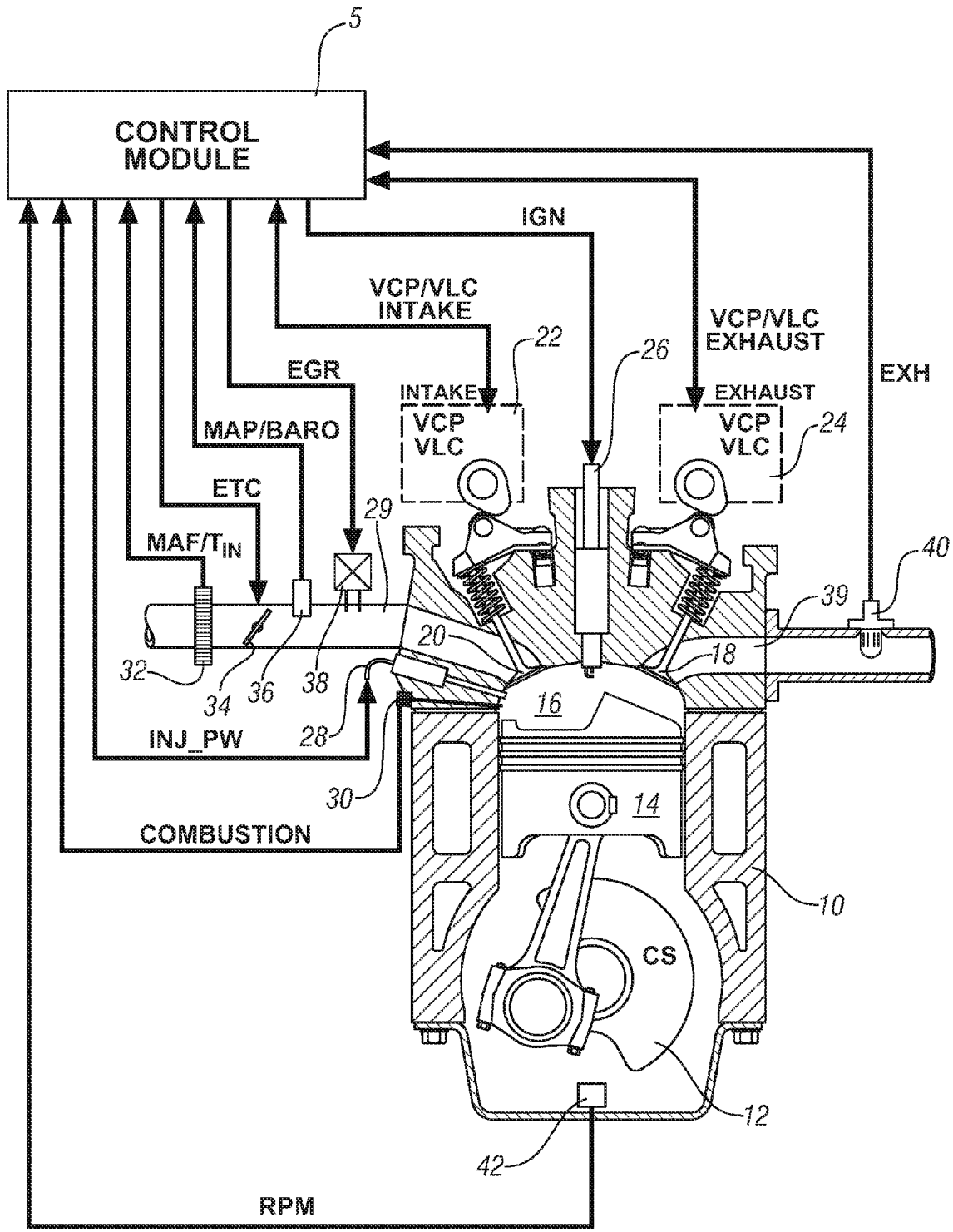
FIG. 1 is a schematic drawing of an engine system, in accordance with the present invention.

Referring now to the drawings, wherein the depictions are for the purpose of illustrating the invention only and not for the purpose of limiting the same, FIG. 1 depicts a schematic diagram of an internal combustion engine 10 and accompanying control module 5 that have been constructed in accordance with an embodiment of the invention.

In the embodiment described, the engine is selectively operative in a controlled auto-ignition mode and a conventional spark-ignition mode, although the invention is not so limited. The exemplary engine 10 comprises a multi-cylinder direct-injection four-stroke internal combustion engine having reciprocating pistons 14 slidably movable in cylinders which define variable volume combustion chambers 16. Each of the pistons is connected to a rotating crankshaft 12 ('CS') by which their linear reciprocating motion is translated to rotational motion. There is an air intake system which provides intake air to an intake manifold which directs and distributes the air into an intake 29 to each combustion chamber 14. The air intake system comprises airflow ductwork and devices for monitoring and controlling the air flow. The devices preferably include a mass airflow sensor 32 for monitoring mass airflow ('MAF') and intake air temperature ($T_{IN}$'). There is a throttle valve 34, preferably an electronically controlled device which controls air flow to the engine in response to a control signal ('ETC') from the control module. There is a pressure sensor 36 in the manifold adapted to monitor manifold absolute pressure ('MAP') and barometric pressure ('BARO'). There is an external flow passage for recirculating exhaust gases from engine exhaust to the intake manifold, having a flow control valve, referred to as an exhaust gas recirculation ('EGR') valve 38. The control module 5 is operative to control mass flow of exhaust gas to the engine air intake by controlling opening of the EGR valve.

Figure 3:
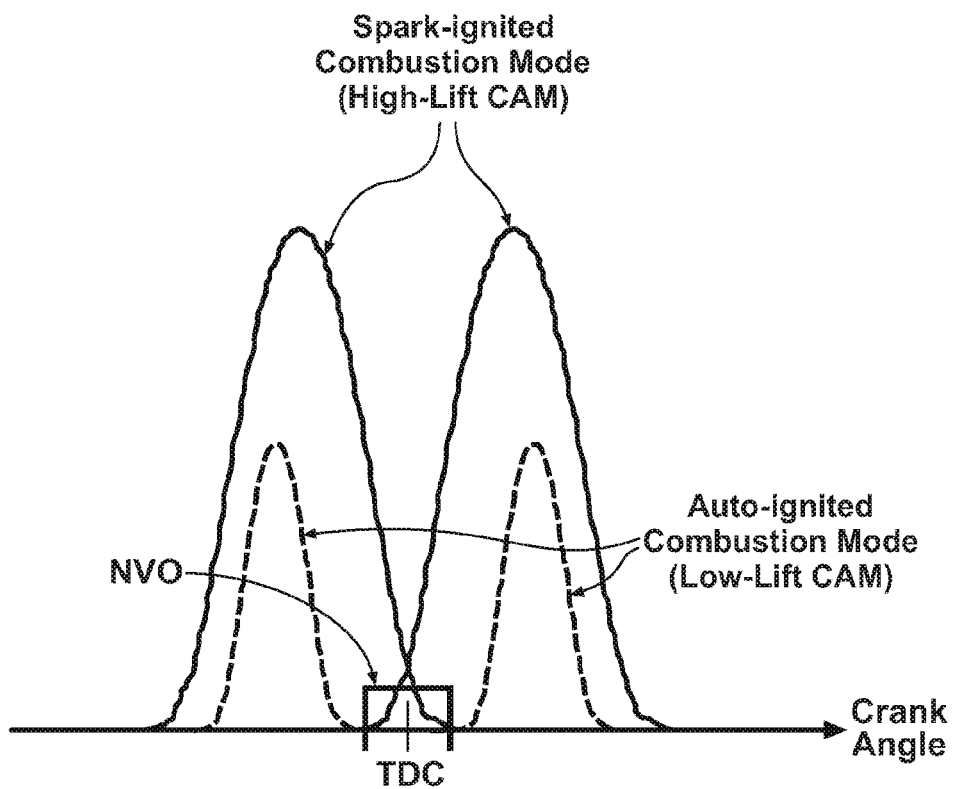

The engine is equipped with engine valves 20, 18 which are selectively actuable to control air flow into and out of each of the combustion chambers 16 of the engine. Air flow from the intake 29 into each of the combustion chambers 16 is controlled by one or more intake valves 20. Flow of combusted gases from each of the combustion chambers to an exhaust manifold via exhaust passages 39 is controlled by one or more exhaust valves 18. Openings and closings of the intake and exhaust valves are preferably controlled with a dual camshaft (as depicted), the rotations of which are linked and indexed with rotation of the crankshaft 12. The engine is equipped with devices for controlling valve lift of the intake valves and the exhaust valves, referred to as variable valve lift control ('VLC'). The variable valve lift system comprises a controllable two-step valve lift device operative to control magnitude of valve lift, or opening, to one of two discrete steps, e.g., a low-lift valve open position (about 4-6 mm) for load speed, low load operation, and a high-lift valve open position (about 8-10 mm) for high speed and high load operation. The engine is further equipped with devices for controlling phasing (i.e., relative timing) of opening and closing of the intake valves and the exhaust valves, referred to as variable cam phasing ('VCP'), to control phasing beyond that which is effected by the two-step VLC lift. There is a VCP/VLC system 22 for the engine intake and a VCP/VLC system 24 for the engine exhaust. The VCP/VLC systems are controlled by the control module. Referring to FIG. 3, typical intake and exhaust valve opening profiles for low-lift operation and high-lift operation are depicted, including identifying the negative valve overlap period (NVO). When the engine is operating in the controlled auto-ignition mode with an exhaust recompression valve strategy the low lift operation is typically used, and when the engine is operating in a spark-ignition combustion mode the high lift operation typically is used. As known to skilled practitioners, VCP/VLC systems have a limited range of authority over which opening and closings of the intake and exhaust valves is controllable. The magnitude of valve lift is described above. Shifting between low-lift operation and high-lift operation can shift valve opening and closing times, as depicted in FIG. 3. Variable cam phasing systems are operable to shift valve opening time relative to crankshaft and piston position, referred to as phasing. The typical VCP system has a range of phasing authority of 60°-90° of crank rotation, thus permitting the control system to advance or retard opening and closing of the engine valves relative to piston position. The range of phasing authority is defined and limited by the hardware of the VCP and the control system which actuates the VCP. The VCP/VLC system is actuated using one of electro-hydraulic, hydraulic, and electric control force, controlled by the control module 5.

The engine includes a fuel injection system, comprising a plurality of high-pressure fuel injectors 28 each adapted to directly inject a mass of fuel into one of the combustion chambers, in response to a signal ('INJ_PW') from the control module. The fuel injectors 28 are supplied pressurized fuel from a fuel distribution system (not shown).

The engine includes a spark ignition system by which spark energy is provided to a spark plug 26 for igniting or assisting in igniting cylinder charges in each of the combustion chambers, in response to a signal ('IGN') from the control module. The spark plug 26 enhances the ignition timing control of the engine at certain conditions (e.g., during cold start and near a low load operation limit).

The engine is equipped with various sensing devices for monitoring engine operation, including a crankshaft rotational speed sensor 42 having output RPM, a sensor 30 adapted to monitor combustion having output COMBUSTION, and, a sensor 40 adapted to monitor exhaust gases having output EXH, typically a wide range air/fuel ratio sensor. The combustion sensor comprises a sensor device operative to monitor a combustion parameter and is depicted as a cylinder pressure sensor to monitor in-cylinder combustion pressure. It is understood that other sensing systems used to monitor cylinder pressure or another combustion parameter which can be translated into combustion phasing are included within the scope of the invention, e.g., ion-sense ignition systems.

The engine is designed to operate un-throttled on gasoline or similar fuel blends with auto-ignition combustion ('HCCI combustion') over an extended range of engine speeds and loads. The engine operates in spark ignition combustion mode with controlled throttle operation with conventional or modified control methods under conditions not conducive to the Controlled auto-ignition combustion mode operation and to obtain maximum engine power to meet an operator torque request. Fueling preferably comprises direct fuel injection into the each of the combustion chambers. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used in the implementation of the present invention.

The control module is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, spark timing, fuel injection mass and timing, intake and/or exhaust valve lift, timing and phasing, and EGR valve position to control flow of recirculated exhaust gases. Valve lift, timing and phasing includes the two-step valve lift, and, negative valve overlap (NVO). The control module 5 is adapted to receive input signals from an operator (e.g., a throttle pedal position and a brake pedal position) to determine an operator torque request ($T_{O\_REQ}$) and from the sensors indicating the engine speed (RPM) and intake air temperature ($T_{IN}$), and coolant temperature and other ambient conditions. The control module 5 operates to determine, from lookup tables in memory, instantaneous control settings for spark timing (as needed), EGR valve position, intake and exhaust valve timing and two-step lift transition set points, and fuel injection timing, and calculates the burned gas fractions in the intake and exhaust systems.

Figure 2:
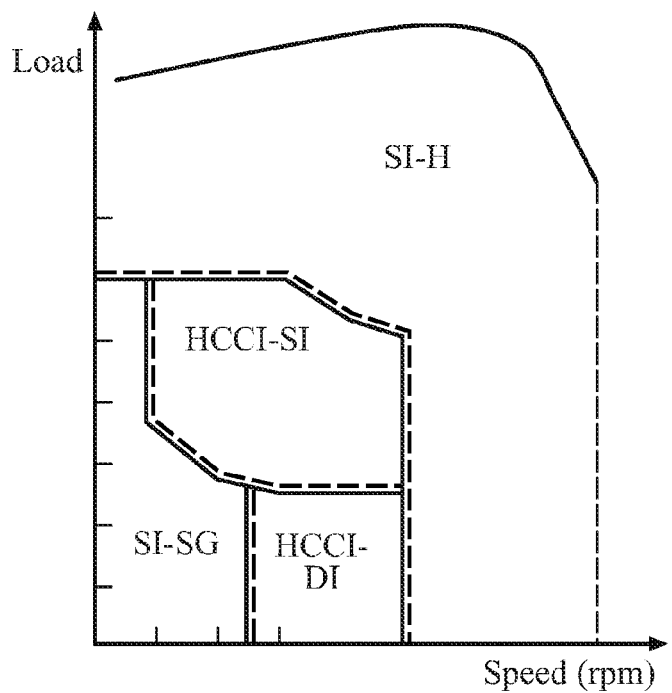
FIGS. 2, 3, and 4 are data graphs, in accordance with the present invention.

Referring now to FIG. 2, the exemplary engine is selectively operative in one of the combustion modes, based upon states of engine parameters, in this embodiment comprising speed (RPM) and load (LOAD) derivable from engine operating parameters such as engine fuel flow (INJ-PW in milligrams), or manifold pressure (MAP). The engine combustion modes comprise a spray-guided spark-ignition (SI-SG) mode, a single injection auto-ignition (HCCI-SI) mode, and double injection auto-ignition (HCCI-DI) mode, and a homogeneous spark-ignition (SI-H) mode. A preferred speed and load operating range for each of the combustion modes is based upon optimum engine operating parameters, including combustion stability, fuel consumption, emissions, engine torque output, and others. Boundaries which define the preferred speed and load operating ranges to delineate the combustion modes are typically determined during pre-production engine calibration and development, and are executed in the engine control module.

Figure 4:
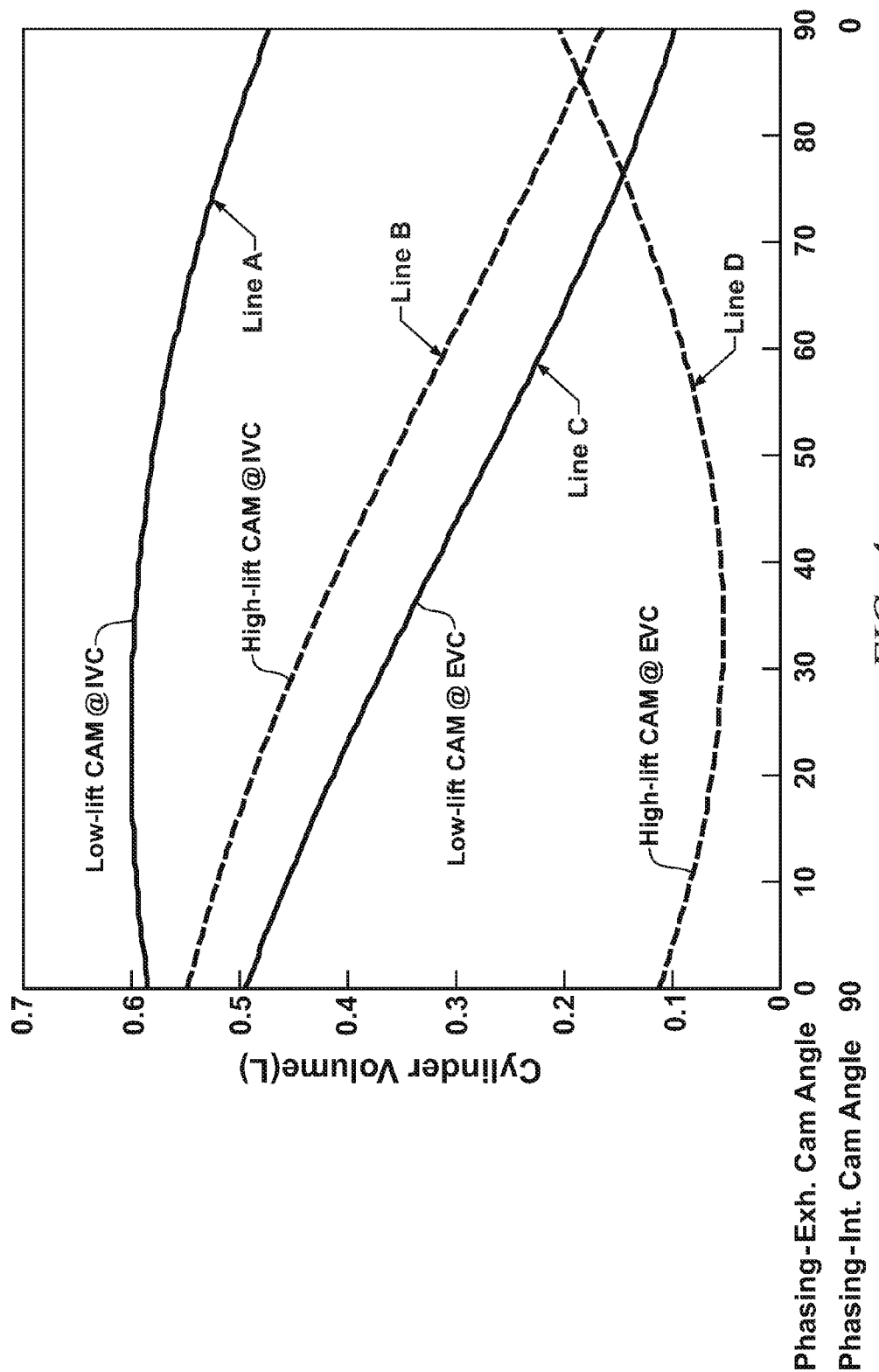

Referring now to FIG. 4, there is graphically depicted cylinder volume over a range of VCP angles. The x-axis depicts the intake cam angle varying over the range of authority of the intake VCP, from 90 degrees to 0 degree, and the exhaust cam angle varying over the range of authority of the exhaust VCP, from 0 degree to 90 degrees. Line A depicts the cylinder volume at the intake valve closing (IVC) over the range of authority of the intake VCP when the VLC controls intake valve lift to the low-lift valve open position. The data depicted by this line indicate that timing of the closing of the intake valve has minimal effect on the cylinder volume at IVC ($V_{IVC}$) over the range of authority of the intake VCP when the VLC is in the low-lift valve open position. Line C depicts the cylinder volume at the exhaust valve closing ($V_{EVC}$) over the range of authority of the exhaust VCP when the VLC controls exhaust valve lift to the low-lift valve open position. The data depicted by this line indicate that timing of the closing of the exhaust valve directly and predominantly affects the cylinder intake volume for the engine airflow ($V_{IVC}$-$V_{EVC}$) over the range of authority of the exhaust VCP when the VLC is in the low-lift valve open position. Thus, at the low-lift valve open position, the cylinder intake volume for the engine airflow is predominantly controlled by the timing of the closing of the exhaust valve, and the timing of the closing of the intake valve has an ancillary, minimal effect.

Line B depicts the cylinder volume at IVC ($V_{IVC}$) over the range of authority of the intake VCP when the VLC controls intake valve lift to the high-lift valve open position. Line D depicts the cylinder volume at EVC ($V_{EVC}$) over the range of authority of the exhaust VCP when the VLC controls exhaust valve lift to the high-lift valve open position. The data depicted by this line indicate that the timing of the closing of the intake valve directly and predominantly affects the cylinder intake volume for the engine airflow ($V_{IVC}$-$V_{EVC}$) over the range of authority of the intake VCP when the VLC is in the high-lift valve open position, and the timing of the closing of the exhaust valve has minimal effect on the cylinder intake volume for the engine airflow over the range of authority of the exhaust VCP when the VLC is in the high-lift valve open position. Thus, at the high-lift valve open position, the cylinder intake volume for the engine airflow is predominantly controlled by the timing of the closing of the intake valve, and the timing of the closing of the exhaust valve has an ancillary, minimal effect. This ability to control the cylinder volume, either $V_{IVC}$ or $V_{EVC}$, by controlling intake and exhaust cam phasing angles is utilized with reference now to the control scheme described hereinafter.

Figure 5:
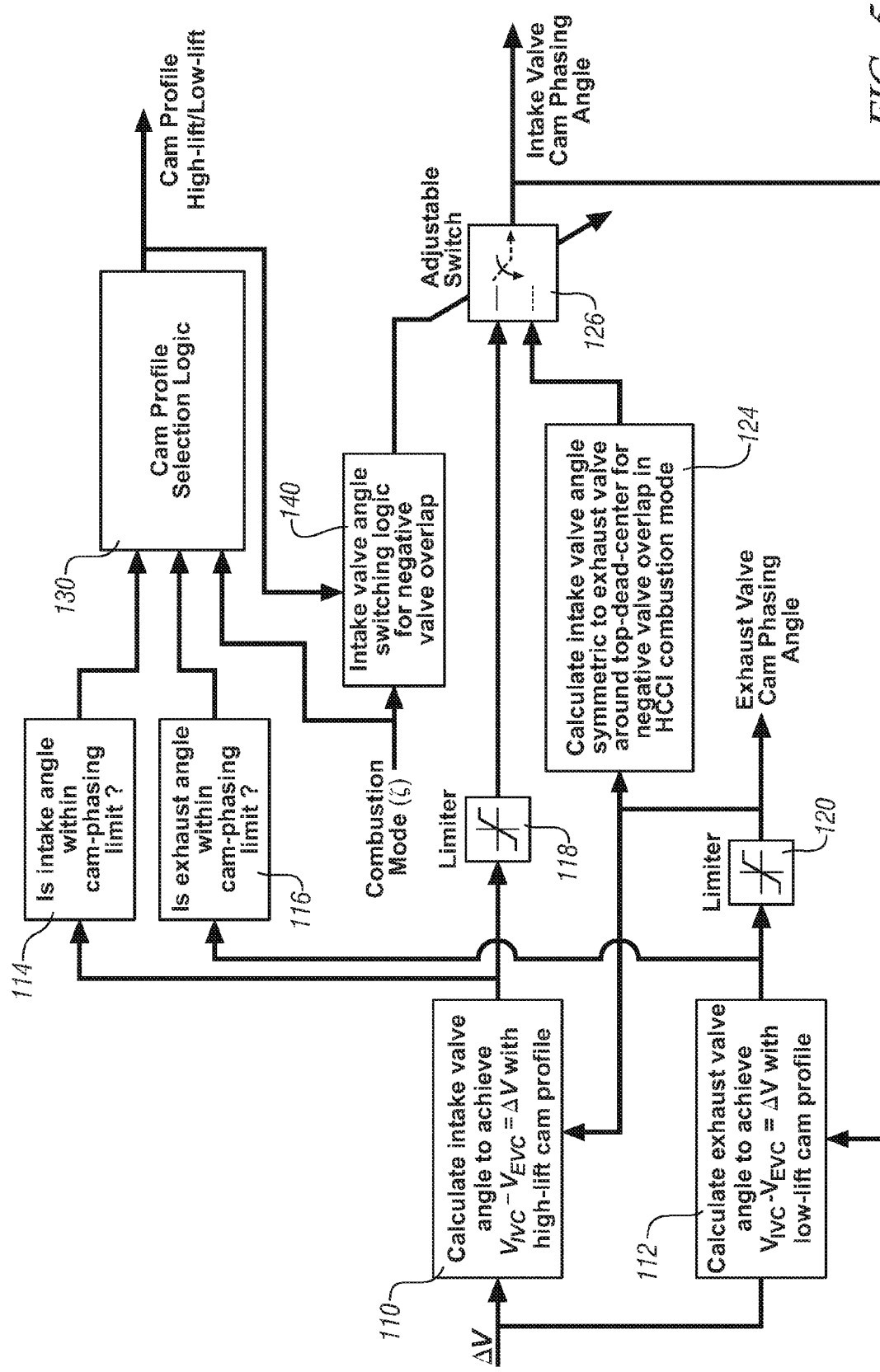
FIGS. 5, 6A and 6B are schematic block diagrams of a control scheme, in accordance with the present invention; and, FIGS. 7A, 7B, and 8 are data graphs, in accordance with the present invention.
Figure 6A:
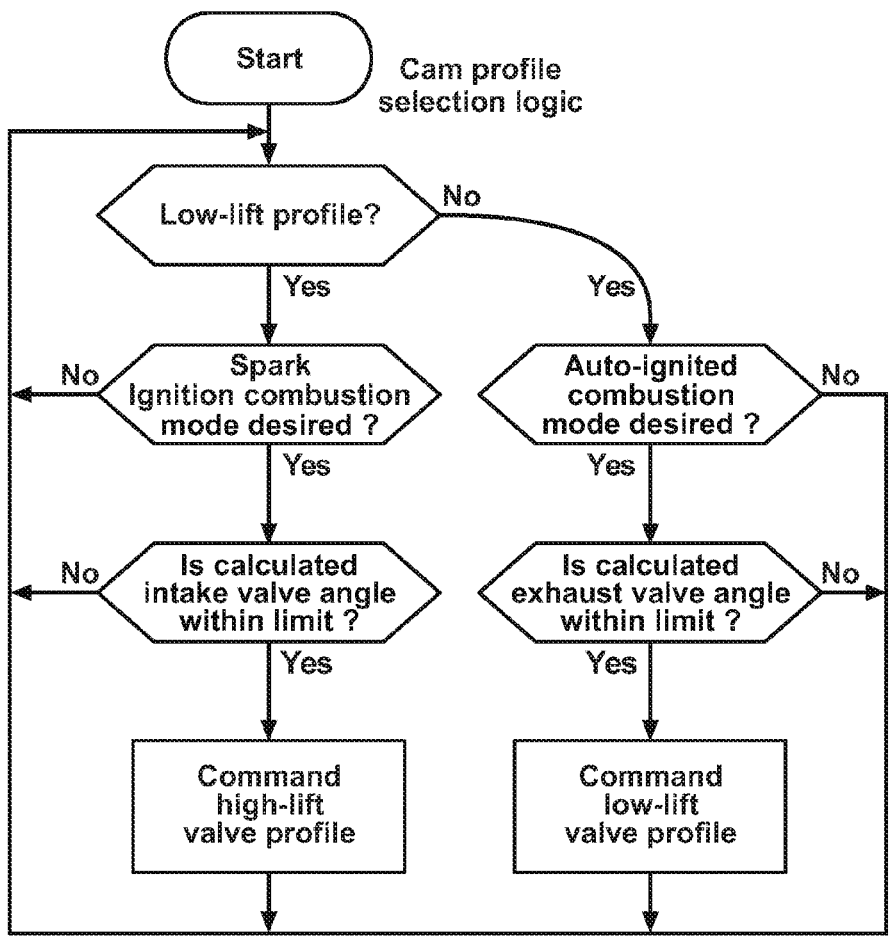
Figure 6B:
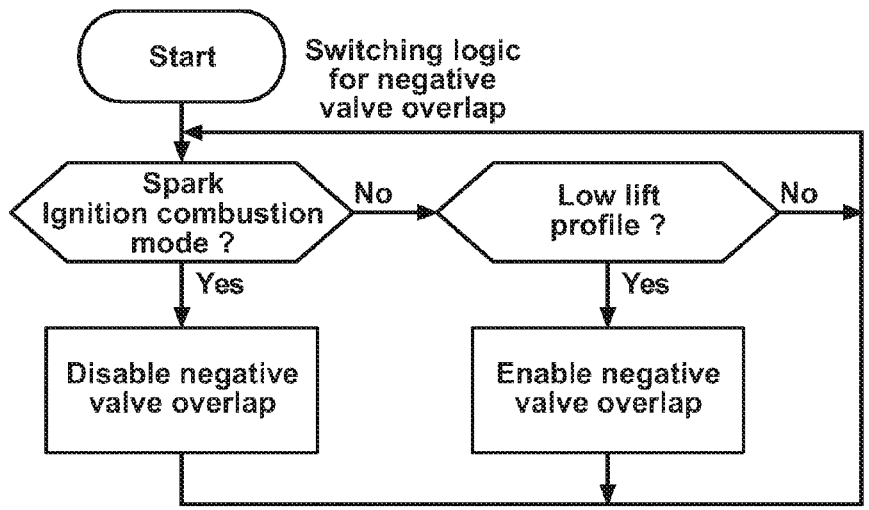

Referring now to FIGS. 5 and 6A and 6B, an exemplary control scheme is now described, in accordance with the invention. The control scheme is executed as one or more algorithms in the control module and comprises controlling the engine valves of the internal combustion engine adapted to selectively operate at one of a first open position and a second open position. The method determining a desired engine airflow based upon an operator torque request. A cylinder intake volume for the desired engine airflow ($\Delta V = V_{IVC} - V_{EVC}$) is determined when operating at the first open position. A control scheme to control the engine valves to attain the cylinder intake volume for the desired engine airflow when operating at the second open position is determined, described with reference to the equations below and the FIGS. 5, 6A, and 6B. The control scheme is executed and the engine is transitioned to the second open position when the cylinder intake volume to operate at the second open position is within a range of authority of the engine valves. This includes controlling the variable lift control systems (VLC) to transition between engine operation at the low-lift engine valve open position and the high-lift engine valve open position. Such change may be commanded in conjunction with transitions between the controlled auto-ignition combustion mode and the SI combustion mode described above, although operation of the control scheme is not so restricted.

Openings and the closings of the intake and exhaust valves 20, 18, including the two-step valve lift (VLC) and variable cam phasing (VCP) are controlled using the variable valve actuation systems 22, 24 during the transitions based upon differences between the current states for mass airflow, intake manifold pressure, and cylinder volume, and, the mass airflow, the intake manifold pressure, and the cylinder volume to operate the engine in the second combustion mode and meet the operator torque request.

The control scheme determines desired states for mass airflow, intake manifold pressure, and cylinder volume to operate the engine in the second or targeted combustion mode. The desired states are determined based upon an operator torque request, typically in the form of operator inputs to accelerator and brake pedals (not shown). Current states for mass airflow and intake manifold pressure are determined using the aforementioned MAF and MAP sensors 32, 36. Opening position of the controllable throttle valve 34 is controlled.

In operation, the command to transition from one of the combustion modes to the second combustion mode is typically based upon a change in the engine speed/load operating point, as described with reference to FIG. 2. The symbol $\zeta$ represents the combustion mode to which the system is commanded to transition, either 0 for the auto-ignited combustion mode, or 1 for the spark-ignited combustion mode. A command to transition between the auto-ignition combustion mode and the spark-ignited mode causes a transition of the VLC system between a high-lift valve open position and a low-lift valve open position.

The mass flow rate of fresh air trapped in the cylinder at intake valve closing, $\dot{m}_{air}$, is modeled using energy balance and ideal gas laws as described hereinbelow in Eq. 1:

$$\dot{m}_{air} = \frac{p_i V_{IVC} - p_e V_{EVC}}{\tau R T_i} = \frac{-\Delta p V_{IVC} + p_e \Delta V}{\tau R T_i} = -\alpha u_1 + \beta u_2, \quad [1]$$

wherein:

$$u_1 = \Delta p = p_e - p_i;$$

$$\Delta V = V_{IVC} - V_{EVC};$$

and, wherein $p_i$ and $p_e$ are the pressures in intake and exhaust manifolds, respectively, $V_{IVC}$ and $V_{EVC}$ are the cylinder volumes at intake valve closing (IVC) and exhaust valve closing (EVC), respectively, $T_i$ is air temperature of intake manifold, i.e., $T_{IN}$, $\tau$ is the time elapsed for an engine cycle, and R is the gas constant. The term V comprises the cylinder intake volume.

Based on the equation, a control algorithm is executed in the control module 5 to determine the cylinder intake volume $\Delta V$ which attains the desired mass flow rate of fresh air trapped in the cylinder at intake valve closing. The cylinder intake volume $\Delta V$, which corresponds to the amount of inducted fresh air charge, is the difference in the cylinder (combustion chamber) volume between intake valve closing (IVC) and exhaust valve closing (EVC). The cylinder volumes, $V_{IVC}$ and $V_{EVC}$, and the cylinder intake volume $\Delta V$ is calculated using known cylinder geometries and slider crank equations for any combination of IVC and EVC.

Referring again to FIG. 5, the cylinder intake volume $\Delta V$ is input to each of blocks 110 and 112. In block 110, an intake valve angle is calculated which attains the cylinder intake volume, $\Delta V$ with the VLC at the high-lift opening condition. The calculated intake valve angle is output to a comparator 114, which determines whether the calculated intake valve angle exceeds the control authority of the intake VCP 22. An output of the comparator 114 is either 'yes' or 'no', indicating whether or not the control authority of the VCP has been exceeded. The calculated intake valve angle is also input to a limiter 118, the output of which is an input to a switch device 126. The output of switch device 126 comprises the IVC phasing angle command signal to the intake VCP 22. Similarly, in block 112, an exhaust valve angle is calculated which attains the cylinder intake volume $\Delta V$ with the VLC at the low-lift operating condition. The calculated exhaust valve angle is output to a comparator 116, which determines whether the calculated exhaust valve angle exceeds the control authority of the exhaust VCP 24. An output of the comparator 116 is either 'yes' or 'no'. The calculated exhaust valve angle is also input to a limiter 120, the output of which comprises the EVC phasing angle command signal to the exhaust VCP 24.

The outputs of blocks 114 and 116 and the combustion mode comprise the inputs to a cam profile selection logic, depicted as item 130, and detailed with reference to FIG. 6A. The cam profile selection logic commands operation from the low-lift opening to the high-lift opening only when the SI combustion mode has been commanded ($\zeta$=1), and the intake valve angle is within of the control authority of the intake VCP. Similarly, the cam profile selection logic commands operation from the high-lift operation to the low-lift operation only when the Controlled auto-ignition combustion mode has been commanded ($\zeta$=0), and the exhaust valve angle is within the control authority of the exhaust VCP.

The output of the cam profile selection logic 130 is also input to an intake valve switching logic for negative valve overlap (NVO), at 140. This operation, at 140, is depicted with reference to FIG. 6B, wherein NVO is commanded only when the Controlled auto-ignition combustion mode has been commanded ($\zeta$=0) and the low-lift operation has been reached.

In NVO operation, an intake valve angle that is symmetric around piston top-dead-center (TDC) to the exhaust valve angle is calculated (Block 124), based upon the limited commanded exhaust valve angle output. This intake angle is input to the switch device 126.

The switch device 126 comprises an algorithmic device which has inputs for the intake valve closing angle; one input comprises the IVC angle from 118, and the other input comprises the IVC angle, preferably symmetric with the exhaust valve, in the low-lift, HCCI operation. The switch device is controlled based on the decision from the intake valve switching logic 140, to provide a linear (i.e., non-discrete) transition in IVC angle between the two inputs previously described, to provide a control output comprising the commanded angle to the intake VCP 22.

The control scheme uses a combination of valve lift position and the cam phasing position to vary the engine air flow, which is proportional to the cylinder intake volume. Corresponding to the respective combustion mode, the two-step valve lift system is commanded to shift from a first valve open position to a second valve open position. During the transition cylinder intake volume corresponding to the mass of the desired fresh air charge is determined. As previously described with reference to FIG. 4, cylinder intake volume and hence the fresh air charge is predominantly controlled by the exhaust VCP when the two-step valve lift system is in the low lift position, with the intake VCP having minimal, or ancillary influence. The cylinder intake volume and hence the fresh air charge is predominantly controlled by the intake VCP when in the high lift position, with the exhaust VCP having minimal, or ancillary influence.

Thus, air flow is controlled by the position of the intake VCP position to attain the determined cylinder volume calculated with the two-step valve lift system in the high valve lift position. The exhaust VCP position to attain the determined cylinder volume is calculated with the two-step valve lift system in the low valve lift position. When a transition between the two combustion modes is commanded, the camshaft for the predominant valve (intake or exhaust, depending on the current valve lift position) is controlled to the desired cam phasing position to attain the determined cylinder volume, as described above, and thus air flow, when the VCP position is within its control authority. Prior to the cam phasing position going beyond its control authority, the two-step valve lift system is preferably shifted to the second valve lift position and the other cam assumes the predominant role of controlling the air flow.

Figure 7A:
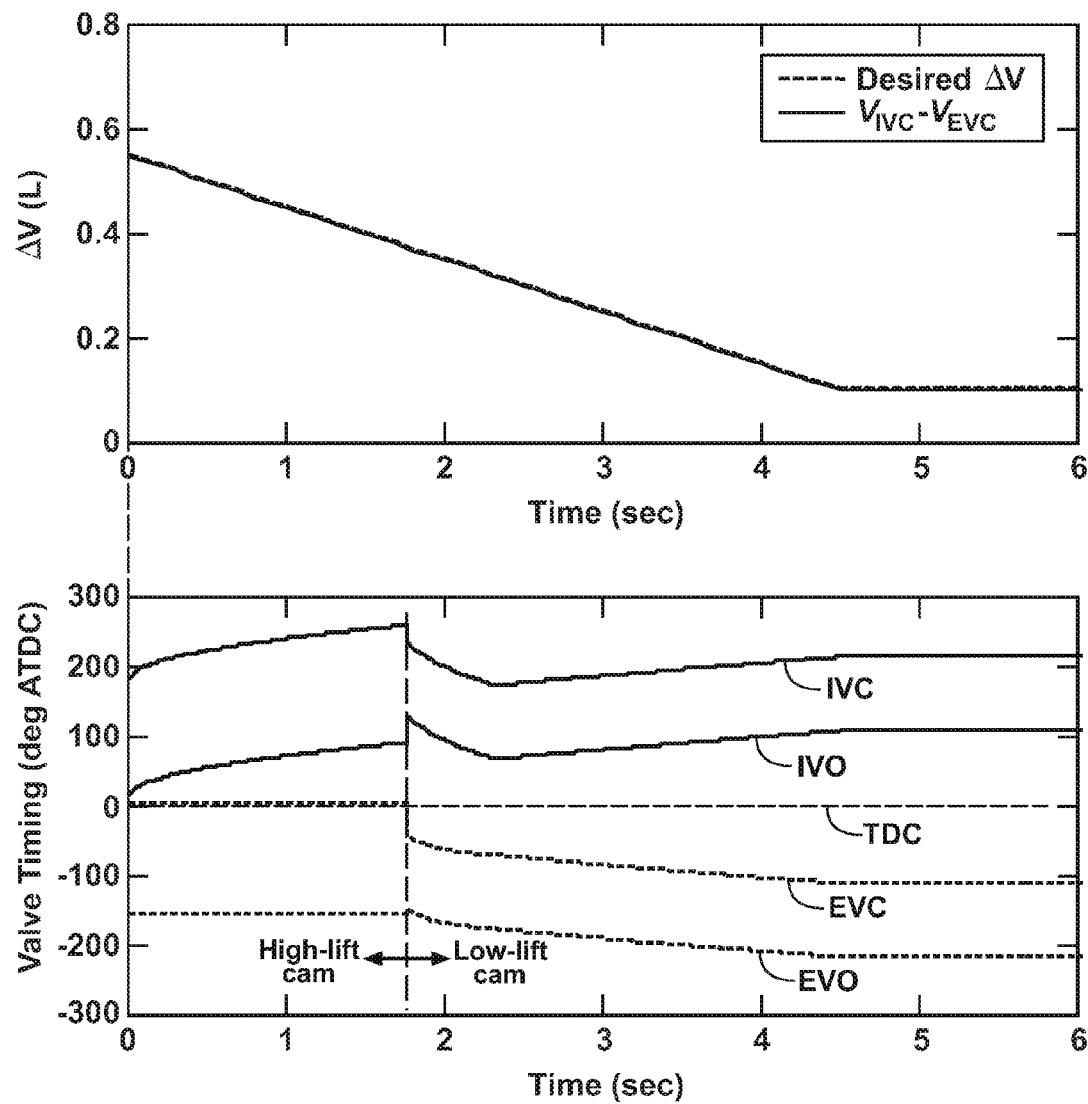
Figure 7B:
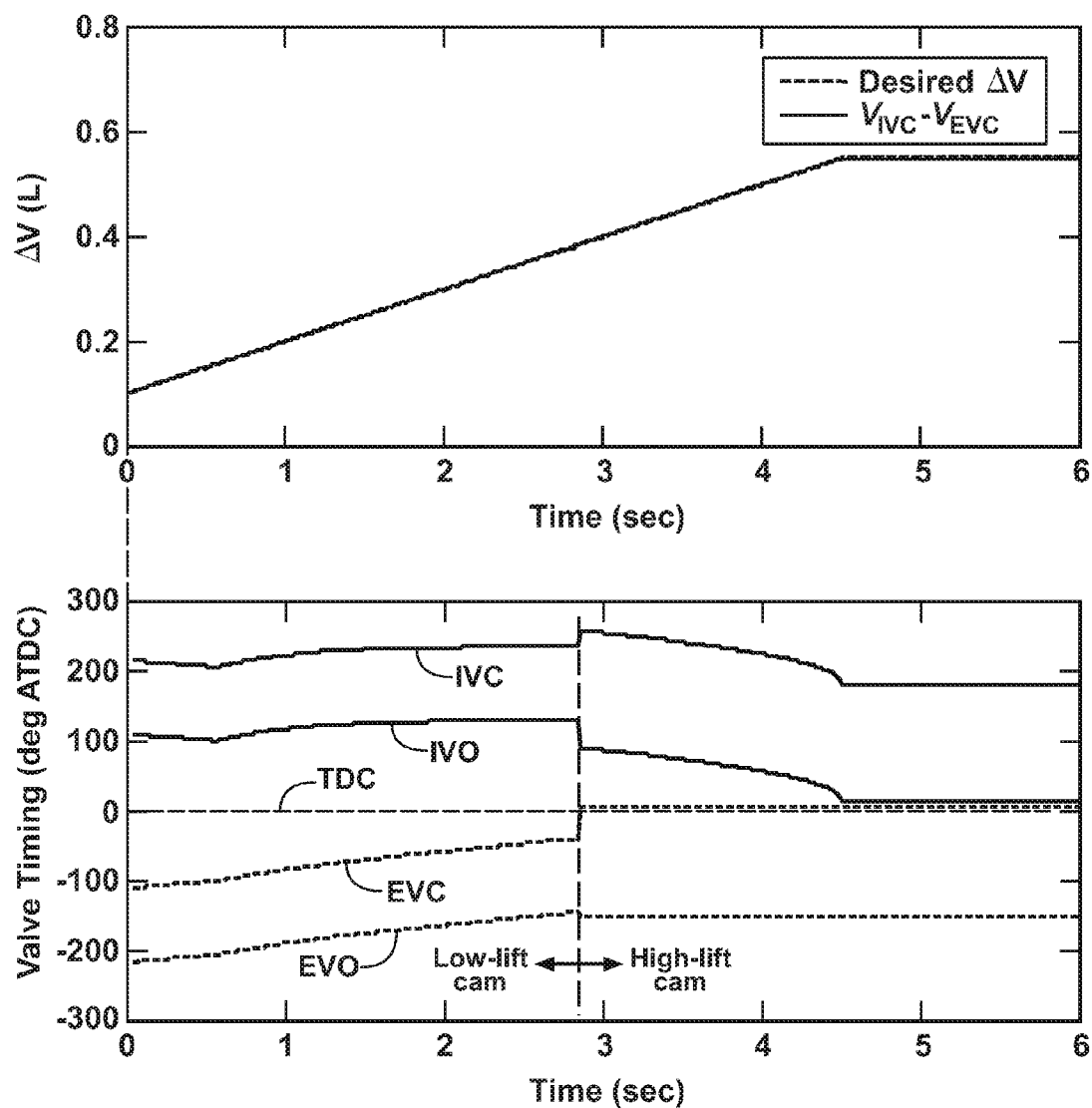

Referring now to FIG. 7A, exemplary results graphically depict transitioning from high-lift operation to low-lift operation. The upper graph depicts the cylinder intake volume, $\Delta V$, in liters (L), decreasing over time, calculated as described above and the desired value. The lower graph depicts timing of opening and closing of the intake and exhaust valves, relative to crank angle at TDC, for intake valve opening (IVO), and intake valve closing (IVC), and exhaust valve opening (EVO) and exhaust valve closing (EVC). A vertical line depicts the point of shifting from operation with the high-lift valve open position to operation with the low-lift valve open position which, calculated using an algorithm based upon the invention described above, which achieves a smooth transition in the cylinder intake volume, $\Delta V$. Referring now to FIG. 7B, exemplary results graphically depict transitioning from the low-lift operation to the high-lift operation, including valve timing, relative to crank angle at TDC, for intake valve opening (IVO), and intake valve closing (IVC), and exhaust valve opening (EVO) and exhaust valve closing (EVC). The results depicted comprise results simulated using an algorithm that was executed in accordance with an embodiment of the invention.

Figure 8:
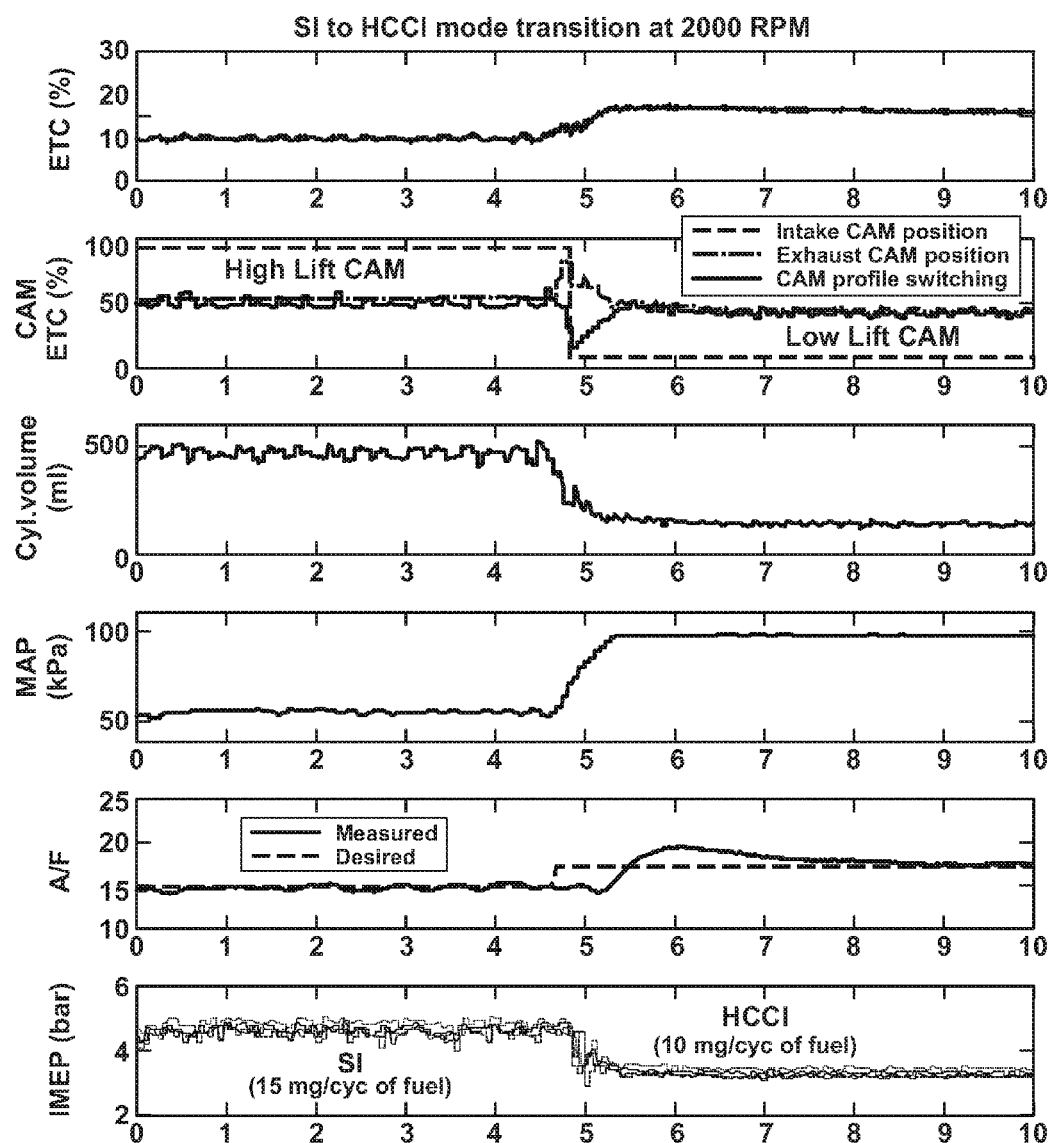

Referring now to FIG. 8, results are depicted for an engine operating using an embodiment of the invention. The engine is operating at a nominal 2000 rpm speed, which has been commanded to transition from SI combustion mode to Controlled auto-ignition combustion mode. The results demonstrate ETC position (in percent), cam angle and transition from high-lift to low-lift operation, cylinder intake volume ($\Delta V$), MAP, commanded and actual air/fuel ratio, and engine output (IMEP) during the transition. The results indicate a minimized perturbation on engine load and air/fuel ratio due to the step change of valve lift during the combustion mode transitions.

The embodiment described hereinabove comprises an engine having a controllable two-step valve lift system and a variable cam phasing system operative to control closings of intake and exhaust valves. Depending on the combination of the valve lift position and the cam phasing positions, the amount of engine air flow varies and is proportional to a cylinder volume that is the difference between the cylinder volumes at intake valve closings and exhaust valve closings. The method comprises monitoring engine operation and an operator torque request. A transition between the spark-ignition combustion mode and the auto-ignition combustion mode based upon the engine operation is commanded. Corresponding to the respective combustion mode, the two-step valve lift system is also commanded to shift from a first valve lift position to a second valve lift position. During the mode transition, the desired value of the cylinder volume which corresponds to the amount of the desired fresh air charge is determined. It is shown that, with the two-step valve lift system in the low lift position, the cylinder volume (thus the inducted fresh air) is less sensitive to the intake cam phasing position. The cylinder volume is less sensitive to the exhaust cam phasing position with the two-step valve lift system in the high lift position. As such, the air flow is predominantly controlled by the exhaust cam phasing when the two-step valve lift system is in the low lift position and by the intake cam phasing position when in the high lift position. To control the air flow, therefore, the intake cam phasing position necessary to achieve the determined cylinder volume are calculated with the two-step valve lift system in the high valve lift position while the exhaust cam phasing position necessary to achieve the determined cylinder volume are calculated with the two-step valve lift system in the low valve lift position. When a transition between the two combustion modes is commanded, the predominant cam (intake or exhaust, depending on the current valve lift position) is controlled to the desired cam phasing position that attains the determined cylinder volume (thus air flow). When the cam phasing position is within its maximum authority and sufficiently close to the desired cam phasing position, the two-step valve lift system is shifted to the second valve lift position and the other cam assumes the dominant role of controlling the air flow.

Alternative embodiments to which the invention is applicable comprise other internal combustion engines having controllable multi-step valve opening control, including those employing multi-step valve openings and/or variable cam phasing for only the intake valves or the exhaust valves.

Further embodiments of the invention include compression-ignition engines equipped with VLC/VCP systems. Further embodiments comprise multi-step lift systems in transitions between any two of the steps. Further embodiments comprise camless valve actuation systems transitioning between low-lift openings and high-lift openings. The invention has been described by reference to certain embodiments. It is intended that the invention not be limited to the disclosed embodiments, but that it have the full scope permitted by the language of the following claims, within the scope of the inventive concepts described.

The invention claimed is:

1. Method for controlling engine valves of an internal combustion engine adapted to selectively operate at one of a first open position and a second open position, the method comprising:
   determining a desired engine airflow based upon an operator torque request;
   determining a cylinder intake volume for the desired engine airflow when operating at the first open position;
   determining a control scheme to control the engine valves to attain the cylinder intake volume for the desired engine airflow when operating at the second open position; and, executing the control scheme and transitioning the engine valves to the second open position when the cylinder intake volume for the desired airflow when operating at the second open position is within a range of authority of the engine valves.

2. The method of claim 1, wherein the internal combustion engine adapted to selectively operate at one of the first open position and the second open position comprises: the internal combustion engine adapted to control magnitude of lift of the engine valve to one of a plurality of discrete lift steps.

3. The method of claim 2, further comprising the internal combustion engine adapted to control phasings of the engine valves.

4. The method of claim 3, further comprising selectively controlling phasings of the engine valves to achieve a negative-valve-overlap condition between a closing of an engine exhaust valve and subsequent opening of an engine intake valve subsequent to the transitioning to the second valve open position, when the second open position comprises a low-lift position.

5. The method of claim 1, wherein determining the cylinder intake volume when operating at the first valve open position with the controllable two-step valve lift system controlled to the first valve lift position further comprises determining a mass of air trapped in the cylinder at intake valve closing.

6. The method of claim 5, wherein determining the cylinder volume further comprises executing an equation to determine a calculated value for the mass flow rate of air trapped in the cylinder at the intake valve closing.

7. The method of claim 5, wherein determining the mass of air trapped in the cylinder at the intake valve closing comprises determining a difference between cylinder volumes at the closing of the intake valve and at the closing of the exhaust valve.

8. The method of claim 1, wherein determining the control scheme to attain the cylinder intake volume for the desired engine airflow when operating at the second valve opening position comprises: determining phasings of openings and closings of the intake and exhaust valves to attain the cylinder intake volume for the desired engine airflow when operating at the second valve opening position.

9. The method of claim 1, wherein determining the control scheme to attain the cylinder intake volume for the desired engine airflow when operating at the second valve open position comprises:
designating a first one of the intake and exhaust valves to be a predominant valve and designating a second one of the intake and exhaust valves to be an ancillary valve for controlling engine air flow when operating at the first valve open position;
determining timing of closing of the predominant valve to attain the determined cylinder intake volume at the first valve lift position; and,
determining timing of closing of the ancillary valve to attain the determined cylinder intake volume at the second valve lift position.

10. The method of claim 9, further comprising designating the intake valve as the predominant valve and designating the exhaust valve as the ancillary valve for controlling engine air flow when operating at the first valve open position comprising a high-lift valve open position.

11. The method of claim 9, further comprising designating the exhaust valve as the predominant valve and designating the intake valve as the ancillary valve for controlling engine air flow when operating at the first valve open position comprising a low-lift valve open position.

12. Method for controlling airflow into an internal combustion engine selectively operative at one of a first engine valve lift position and a second engine valve lift position during a transition therebetween, the method comprising:
adapting the engine to control phasings of the engine valves;
determining a desired engine airflow based upon an operator torque request;
determining a cylinder intake volume for the desired engine airflow when operating at the first valve lift position;
determining a valve control scheme to attain the cylinder intake volume for the desired engine airflow when operating at the second valve lift position; and,
shifting to the second valve lift position and executing the valve control scheme when the cylinder intake volume to operate at the second valve lift position is within a range of authority of the controlled phasings of the engine valves.

13. The method of claim 12, wherein determining the cylinder intake volume for the desired engine airflow when operating at the first valve open position with the controllable two-step valve lift system controlled to the first valve lift position further comprises determining a mass of air trapped in the cylinder at the intake valve closing.

14. The method of claim 13, wherein determining the mass of air trapped in the cylinder at the intake valve closing comprises determining a difference between cylinder volumes at the closing of the intake valve and at the closing of the exhaust valve.

15. The method of claim 14, wherein determining the valve control scheme to attain the cylinder intake volume for the desired engine airflow when operating at the second valve opening position comprises: determining phasings of openings and closings of the intake and exhaust valves to attain the cylinder intake volume for the desired engine airflow when operating at the second valve opening position.

16. The method of claim 12, wherein determining the valve control scheme to attain the cylinder intake volume for the desired engine airflow when operating at the second valve open position comprises:
designating a first one of the intake and exhaust valves to be a predominant valve and designating a second one of the intake and exhaust valves to be an ancillary valve for controlling engine air flow when operating at the first valve open position;
determining timing of closing of the predominant valve to attain the determined cylinder intake volume at the first valve lift position; and,
determining timing of closing of the ancillary valve to attain the determined cylinder intake volume at the second valve lift position.

17. Method for controlling an internal combustion engine during a transition between a spark-ignition combustion mode and a controlled auto-ignition combustion mode, the internal combustion engine including a controllable two-step valve lift system and a variable cam phasing system operative to control openings and closings of intake and exhaust valves, the method comprising:
monitoring engine operation and an operator torque request;
commanding a transition between the spark-ignition combustion mode and the controlled auto-ignition combustion mode based upon the engine operation;
commanding the two-step valve lift system to shift from a first valve lift position to a second valve lift position;

determining a desired engine airflow based upon an operator torque request;

determining a cylinder intake volume for the desired engine airflow when operating at a first open position;

determining a control scheme to control the openings and closings of the engine valves to attain the cylinder intake volume for the desired engine airflow when operating at the second valve lift position; and, executing the control scheme and transitioning to the second valve lift position when the cylinder intake volume to operate at the second valve lift position is within a range of authority of the engine valves.

18. The method of claim 17, further comprising selectively controlling phasing of the engine valves to achieve a negative-valve-overlap condition between a closing of the exhaust valve and a subsequent opening of the intake valve subsequent to the transitioning to the second valve open position, when the second open position comprises a low-lift position.

19. The method of claim 17, wherein determining the cylinder intake volume for the desired engine airflow when operating at the first open position further comprises:

determining a mass of air trapped in a cylinder of the engine at intake valve closing; and, determining the cylinder volume corresponding to the mass of air trapped in the cylinder of the engine.

20. The method of claim 19, wherein determining the cylinder volume for the mass flow of air trapped in the cylinder of the engine comprises determining cylinder volumes at closing of the intake valve and at closing of the exhaust valve.

21. The method of claim 17, further comprising: controlling a controllable engine throttle valve to a wide-open-throttle position when the transitioned combustion mode comprises the auto-ignition combustion mode.

22. The method of claim 17, further comprising: controlling a controllable engine throttle valve when the transitioned combustion mode comprises the spark-ignition combustion mode.

23. Method for controlling engine valves of an internal combustion engine adapted to selectively operate at one of a first open position and a second open position, the method comprising:

determining a desired engine airflow based upon an operator torque request;

determining a cylinder intake volume for the desired engine airflow for the one of the first and second open positions that is operative;

determining a control scheme to control the engine valves to attain the cylinder intake volume for the desired engine airflow for the one of the first and second open positions that is inoperative; and, executing the control scheme and transitioning the engine valves to the inoperative one of the first and second open positions when the cylinder intake volume for the desired airflow for the one of the first and second open positions that is inoperative is within a range of authority of the engine valves.

* * * * *